United States Patent
Taylor et al.

(10) Patent No.: US 10,446,056 B1
(45) Date of Patent: Oct. 15, 2019

(54) GAME WITH VISUAL CUEING SYSTEM AND ORAL-AURAL LEARNING ROUTINE

(71) Applicant: English Language Training Solutions LLC, Santa Fe, NM (US)

(72) Inventors: Karen Ann Taylor, Santa Fe, NM (US); Shirley Thompson, Washington, DC (US); Laura McIndoo, Albuquerque, NM (US)

(73) Assignee: English Language Training Solutions LLC, Santa Fe, NM (US)

( * ) Notice: Subject to any disclaimer, the term of this patent is extended or adjusted under 35 U.S.C. 154(b) by 253 days.

(21) Appl. No.: 15/061,531

(22) Filed: Mar. 4, 2016

Related U.S. Application Data

(60) Provisional application No. 62/129,179, filed on Mar. 6, 2015.

(51) Int. Cl.
*A63F 9/24* (2006.01)
*G09B 19/04* (2006.01)
*G09B 19/08* (2006.01)

(52) U.S. Cl.
CPC .............. *G09B 19/04* (2013.01); *G09B 19/08* (2013.01)

(58) Field of Classification Search
CPC .......... G09B 19/04; G09B 19/06; G09B 5/06; G09B 17/003; G09B 19/00; G09B 5/02; G09B 5/067; G09B 7/06
See application file for complete search history.

(56) References Cited

U.S. PATENT DOCUMENTS

| 4,030,211 A | * | 6/1977 | McGinley | G09B 19/04 434/167 |
| 4,713,008 A | * | 12/1987 | Stocker | G09B 17/00 283/46 |
| 5,429,513 A | * | 7/1995 | Diaz-Plaza | G09B 1/00 273/302 |
| 5,607,309 A | | 3/1997 | Finn | |
| 5,711,527 A | | 1/1998 | Phalin et al. | |

(Continued)

OTHER PUBLICATIONS

"Merriam Webster Definitions.pdf", 2010, Merriam-Webster, at https://www.merriam-webster.com/, (last downloaded Apr. 14, 2019, p. 1).*

(Continued)

*Primary Examiner* — Steve Rowland

(57) ABSTRACT

An audiovisual cueing system includes a visual game focusing on the fifteen vowel sounds of American English. Players take spoken turns corresponding with a sound-based word pattern determined by cards in play. Each card includes a color border, image, and featured word. The stressed vowel sounds in the color and object guide players to use the same sound in the underlined part of the featured word despite different spelling patterns. Players compare colors on cards in hand with a discard pile card, and if there is a match, the matched card is discarded and six corresponding words spoken in succession (e.g., "blue moon soon, blue moon June"). The act of speaking these words in succession provides a moment of learning and practice that benefits the player, while the game objective (winning) compels the learner to persist. The first player to discard all cards in hand is awarded points or wins.

16 Claims, 6 Drawing Sheets

(56) References Cited

U.S. PATENT DOCUMENTS

| | | | | |
|---|---|---|---|---|
| 5,953,692 | A | * | 9/1999 | Siegel ............... G06F 17/30017 434/167 |
| 6,077,080 | A | * | 6/2000 | Rai ......................... G09B 1/00 434/159 |
| 6,126,447 | A | * | 10/2000 | Engelbrite ............. G09B 19/06 434/167 |
| 7,156,393 | B2 | | 1/2007 | Wagnon et al. |
| 9,220,973 | B1 | | 12/2015 | Stringer |
| 2004/0115598 | A1 | * | 6/2004 | Goodfriend ............ G09B 17/00 434/159 |
| 2006/0040242 | A1 | * | 2/2006 | Mejia ....................... G09B 1/00 434/170 |
| 2012/0164611 | A1 | * | 6/2012 | O ............................. G09B 5/06 434/167 |
| 2013/0143184 | A1 | * | 6/2013 | Neikrug ................. G09B 19/00 434/169 |

OTHER PUBLICATIONS

International Phonetic Association, The International Phonetic Alphabet (revised to 2015), copyright 2005, 2015, downloaded on Jan. 21, 2019 from https://www.internationalphoneticassociation.org/content/full-ipa-chart.

Szynalski & Wojcik, Phonetics alphabets reference, downloaded on Jan. 21, 2019 from http://www.antimoon.com/resources/phonchart.htm.

Taylor & Thompson, The Color Vowel Chart, copyright 1999, 2012, 2015; as shown in 4th Edition Binder Inserts (Set of 10)—ELTS, Downloaded on Jan. 21, 2019 from https://elts.solutions/product/4th-edition-binder-insert-class-set/.

Davenport, et al. Introducing Phonetics & Phonology, Published 1998 by Oxford University Press, Inc., New York.

Thompson, Grass is Black—Pronunciation Dictionary and Workbook, Second Edition, Published 2013 by Thompson Language Center, Ontario.

\* cited by examiner

GAME WITH VISUAL CUEING SYSTEM AND ORAL-AURAL LEARNING ROUTINE

CROSS-REFERENCE TO RELATED APPLICATIONS

This application claims priority under 35 USC § 119(e) to U.S. Provisional Patent Application 62/129,179 filed Mar. 6, 2015, the entirety of which is incorporated by reference herein.

FIELD OF THE INVENTION

This document concerns an invention relating generally to an audiovisual cueing system for English language learners and emerging readers, and a protocol for engaging players in a game involving audible pronunciations of sequences of words having stressed syllables with substantially the same sound.

BACKGROUND OF THE INVENTION

Although English is an alphabetic language, it is not a phonetically written language, such that written English is not directly correlated with spoken English. Unlike Spanish, for example, where the letter "o" always represents the sound /o/ (as in rosa, flor, and jardinero), the letter "o" in English can represent a variety of sounds (as illustrated in the words "to," "of," "so," "off," "woman," and "women"). The "deep orthography" of English sets it apart from other alphabetic languages, most of which have more transparent orthographies. A challenge presented is that speakers of other languages find it difficult to abandon their implicit assumption that "sounding it out" is an effective strategy for pronouncing the English words they see in print. A second challenge is that literate/native English speakers are successful readers precisely because they suppress awareness of deep orthography such that they, too, are prone to believe they are "sounding out" words even when those words feature ambiguous orthography (such as "snow" vs. "plow" and "clean" vs. "bread"). It should be noted that from successful readers come teachers of language and reading who, ironically, are predisposed to underestimate the problem of deep orthography with respect to learning.

The conventional response to the problem of deep orthography in English is to represent pronunciation with phonetic symbols. Phonetic symbols are intended to establish a one-to-one correspondence between sound and symbol, thereby representing the way a word sounds regardless of its spelling. Examples of American Phonetic Alphabet symbols used to indicate sounds in a word include: two/tu$^w$/; son /sʌn/; go/go$^w$/; off/ɒ f/; woman/w ʊ mə n/; and women/wímə n/.

Phonetic symbols provide linguists and other educated people with a common language to examine the sounds of language. However, phonetic symbols are limited in their accessibility, and are basically inaccessible to those who struggle with the printed word. Moreover, phonetic symbols appear in many forms, with the International Phonetic Alphabet and American Phonetic Alphabet serving as bases for the broad range of modified phonetic alphabets found in various English dictionaries. Faced with these multiple modified phonetic alphabets, struggling learners quickly learn to avoid dictionaries as a resource for determining the pronunciation of a word. It is worth noting that most of the variation among phonetic alphabets is seen in the representation of vowel sounds.

When used by educated and literate learners, the use of phonetic transcription poses a more general problem: when presented with the individual sounds of a word, learners often conclude that each sound is equally important. In fact, each sound is not equally important in the context of a word or phrase: spoken English allows for a great deal of variation in individual sounds, but does require two elements in order to be comprehensible to another speaker of English: 1) that the speaker places stress (emphasis) on the appropriate syllable; and 2) that at the nucleus of that stressed syllable is an appropriate vowel sound. The word "canal," for example, is virtually incomprehensible if the speaker places stress on the first syllable (/káenə l/) instead of the second (/k ə nάel/). In this respect, the use of phonetic symbols provides too much information and places an unrealistic burden on learners to filter through the information and prioritize their findings.

What is needed is a fun and accessible game to help English language learners bridge the gap between spoken and written English.

SUMMARY OF THE INVENTION

The invention, which is defined by the claims set forth at the end of this document, is directed to audiovisual cueing systems and text markup protocols which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 1 and 6, an exemplary system and method for language training involves a card-based word game 200 that engages two or more players 210, 230 in successive uses of the "spoken turn" 220, 240, which is a unique oral/aural routine characterizing the game. The spoken turn allows the player to feel how his or her mouth forms different sounds thereby gaining more awareness of how to produce vowel sounds with greater accuracy. The version of the cueing system depicted in the drawings includes a set of cards each having two sections 20, 30, each section having a colored border 40 and an image of an object 50. The color of the border and the object in the image correspond with words that have stressed syllables with substantially the same sound (such as "blue" and "moon"). Each section 20, 30 also includes a printed word 60 that also has a stressed syllable with substantially the same sound as the color 40 and object 50 in that section 20, 30 (such as "soon" and "June"). Players compare cards they are dealt with the card at the top of a discard pile 250 to find a card in hand that has a section with the same color (and image) as one of the sections of the card at the top of the discard pile 250. When a match is found, the player audibly pronounces the words corresponding with two sections of two cards, the two sections having different printed words.

For example, a first player 210 matching a first card 260 having a section with a green border, an image of a cup of green tea, and the printed word "three," with a second card 270 having a section also with a green border and an image of a cup of green tea but with the printed word "people," would have a first spoken turn 220 in which the first player would speak "GREEN TEA people, GREEN TEA three" during his or her turn. The matched card 260, which also includes a section with a silver border and a silver pin, with the featured word "this," is discarded in the discard pile 250, leaving the first player 210 with six cards in his or her hand 280. The second player 230 may scan cards in his or her hand 290 and may find, for example, a card 300 with a section having a silver border and a silver pin—which matches the section of card 260 with a silver pin and the featured word "this"—the second player 230 can place the card 300 in the discard pile 250 and take a second spoken turn 310 in which he or she speaks "SILVER PIN this, SILVER PIN until." If a player does not have a match, he or she draws cards from a draw pile 320 and the game moves to the next player. The player first to discard all cards in hand may win the game, or may win a round of the game in which a certain number of points are awarded to the winner of the round.

By providing an entertaining and engaging game, one that requires active participation and social interaction among competing players, participants are more likely to persevere in the training process. The image-to-sound cueing system and text markup protocol discussed in this document provide the individual with a simple and accurate way to determine the sound of a word, even short words that educated native speakers may think are "sound outable" (precisely because they already know how to read) but which are not. For example, the spellings of over/oven, and even/ever differ only in the consonant letters, yet the pronunciation of these words differs significantly in the vowel sound: over (sharing the vowel sounds of "ROSE" and "COAT") vs. oven (sharing the vowel sounds of "CUP" and "MUSTARD"); and even (sharing the vowel sounds of "GREEN" and "TEA") vs. ever ("RED" and "DRESS"). A learner approaching these words as "sound outable" could easily conclude that oven is pronounced/owvɛn/or that even is pronounced/ɛvɛn/.

In looking at the printed word, beginning readers and non-native speakers of English often struggle to know how a word is supposed to sound. This difficulty plays out in different ways for different learners: the struggling reader has trouble decoding a word they already know how to say, while the non-native speaker of English has trouble pronouncing the word they recognize on paper. Both types of difficulties are addressed here, scaffolding the learner's success by providing them with simple cues that eliminate the need for phonetic symbols.

Also, English vowel sounds themselves pose a particular challenge to English language learners. Where, for example, Spanish consists of five vowel sounds and Mandarin six, spoken English utilizes approximately 15 vowels sounds. Learners of English often have difficulty perceiving these sounds, and production can be equally difficult. The spoken turn creates substantive opportunities to practice these new sounds in the context of written words whose spellings may otherwise mislead. This improved perception ultimately leads to greater language confidence through stronger listening comprehension and more comprehensible pronunciation.

Moreover, the syllable-timed nature of spoken English makes it fundamentally different from stress-timed languages such as Spanish, French, Arabic, Mandarin, Korean, and Vietnamese. For native speakers of syllable-timed languages, the central sound of English—its use of vowel stress and reduction to create meaning—is applied unconsciously, and is therefore not easily noticed.

The combination of these factors—the importance of stress and the difficulty of producing and perceiving vowels—can result in a complete communication breakdown. The vowel quality of the main stressed syllable in a phrase is what listeners rely on first to comprehend the message. Therefore, if the main stressed vowel strays too far from the target, it is a communicative "deal breaker." The centrality of stress-timing in spoken English is reinforced by providing the learner with engaging practice and meaningful repetition. With each spoken turn, the centrality of stress-timing in spoken English is reinforced by providing the learner with engaging practice and meaningful repetition.

This invention takes a sound-to-symbol approach to supporting pronunciation and reading, a radical departure from the widespread conventional approach in which symbols are treated as the foundational units of instruction and learning.

Further advantages and features of the invention will be apparent from the remainder of this document in conjunction with the associated drawings.

DETAILED DESCRIPTION OF PREFERRED VERSIONS OF THE INVENTION

In exemplary versions, a turn-based word game utilizes a set of 15 key word phrases corresponding with 15 equally valid sounds: (1) GREEN TEA 10A; (2) SILVER PIN 10B; (3) GRAY DAY 10C; (4) RED DRESS 10D; (5) BLACK CAT 10E; (6) WHITE TIE 10F; (7) TURQUOISE TOY 10G; (8) PURPLE SHIRT 10H; (9) A CUP OF MUSTARD 10I; (10) OLIVE SOCK 10J; (11) BLUE MOON 10K; (12) WOODEN HOOK 10L; (13) ROSE COAT 10M; (14) BROWN COW 10N; (15) ORANGE DOOR or AUBURN DOG 100. Notably, the fifteen sounds are formed using different positions of the tongue, jaw, and lips in combination.

Figure 1:
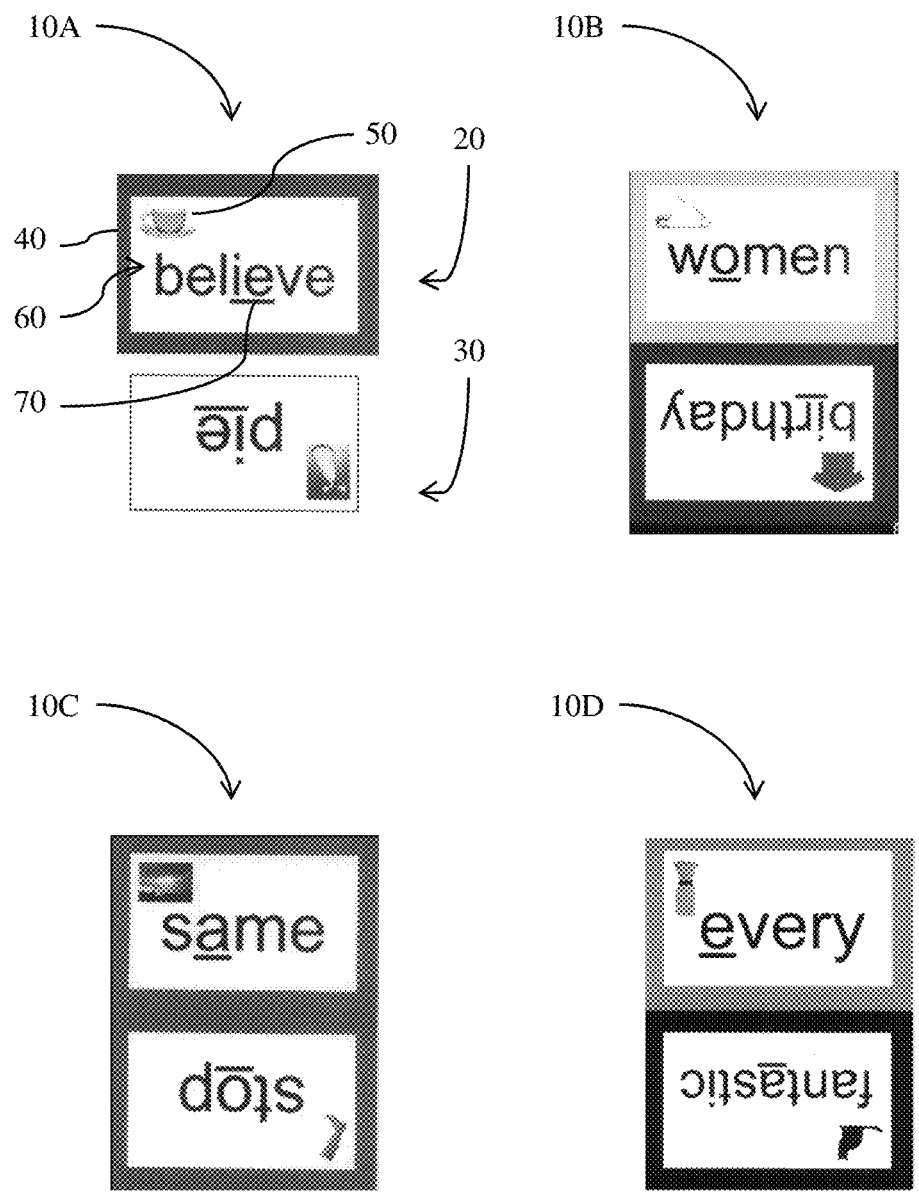
FIG. 1 shows four possible exemplary variations among the set of (for example) 104 cards that can be used to play the game, with sections representing: GREEN TEA believe, WHITE TIE pie 10A; SILVER PIN women, PURPLE SHIRT birthday 10B; GRAY DAY same, OLIVE SOCK st op 10C; and RED DRESS every, BLACK CAT fantastic 10D.
Figure 2:
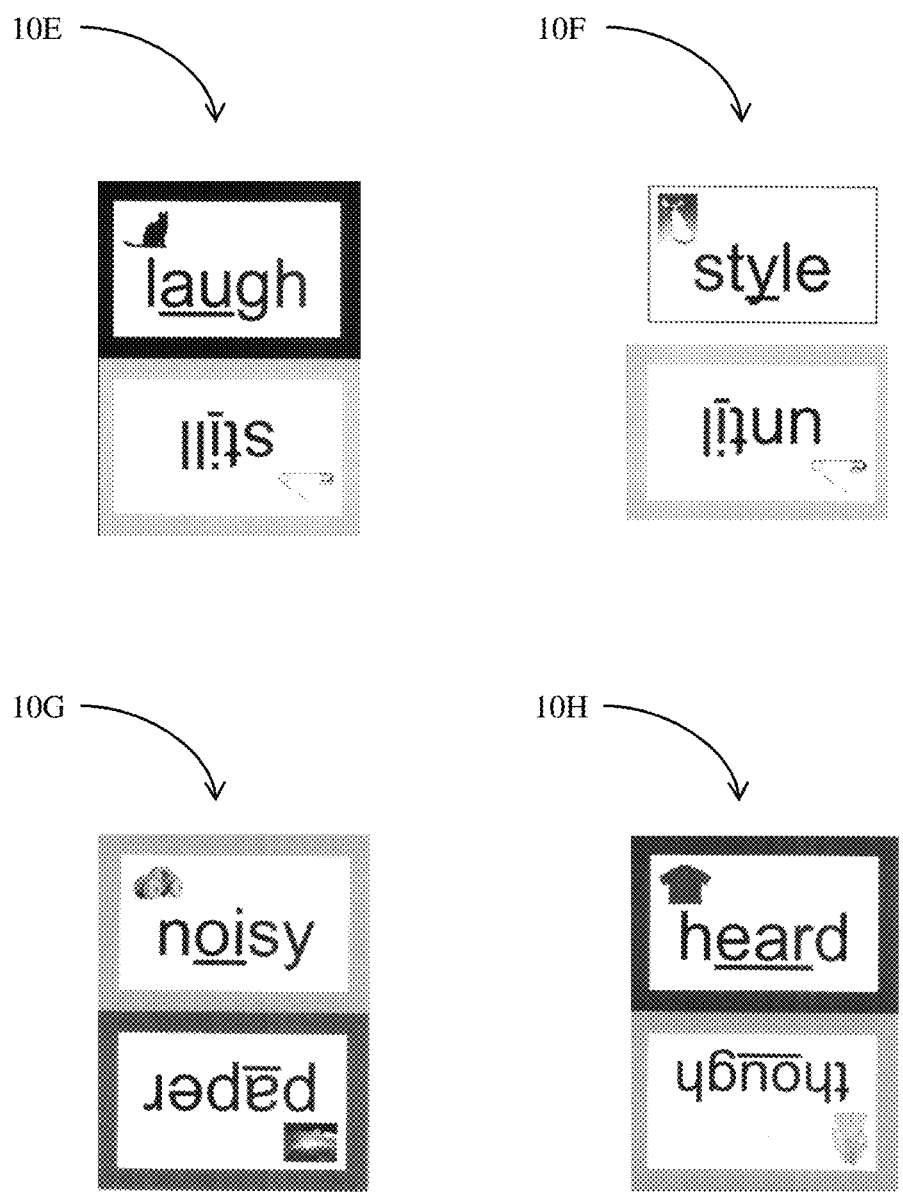
FIG. 2 shows four additional possible exemplary variations among the set of (for example) 104 cards that can be used to play the game, with sections representing: BLACK CAT laugh, SILVER PIN still 10E; WHITE TIE style, SILVER PIN until 10F; TURQUOISE TOY noisy, GRAY DAY paper 10G; and PURPLE SHIRT heard, ROSE COAT though 10H.
Figure 3:
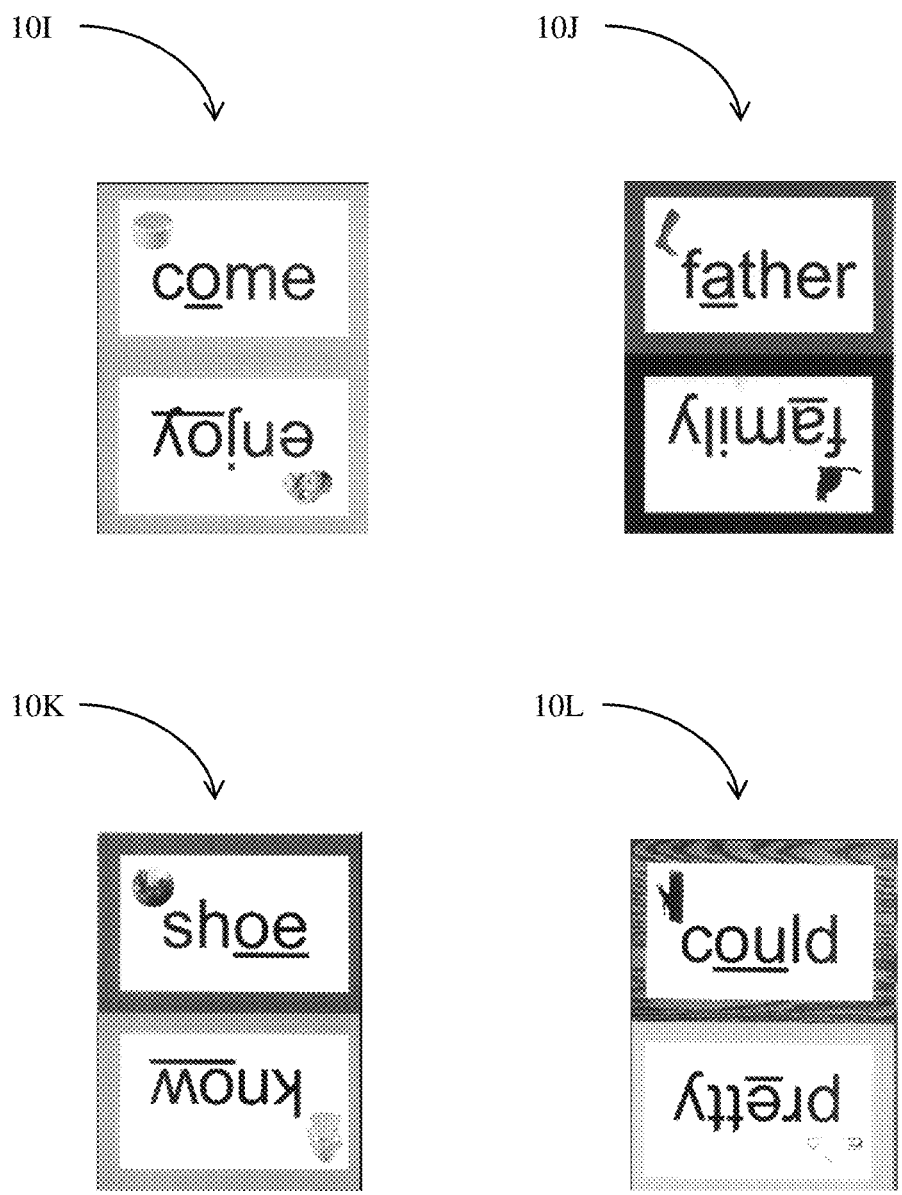
FIG. 3 shows four additional possible exemplary variations among the set of (for example) 104 cards that can be used to play the game, with sections representing: A CUP OF MUSTARD come, TURQUOISE TOY enjoy 10I; OLIVE SOCK father, BLACK CAT family 10J; BLUE MOON sh oe, ROSE COAT know 10K; and WOODEN HOOK could, SILVER PIN pretty 10L.
Figure 4:
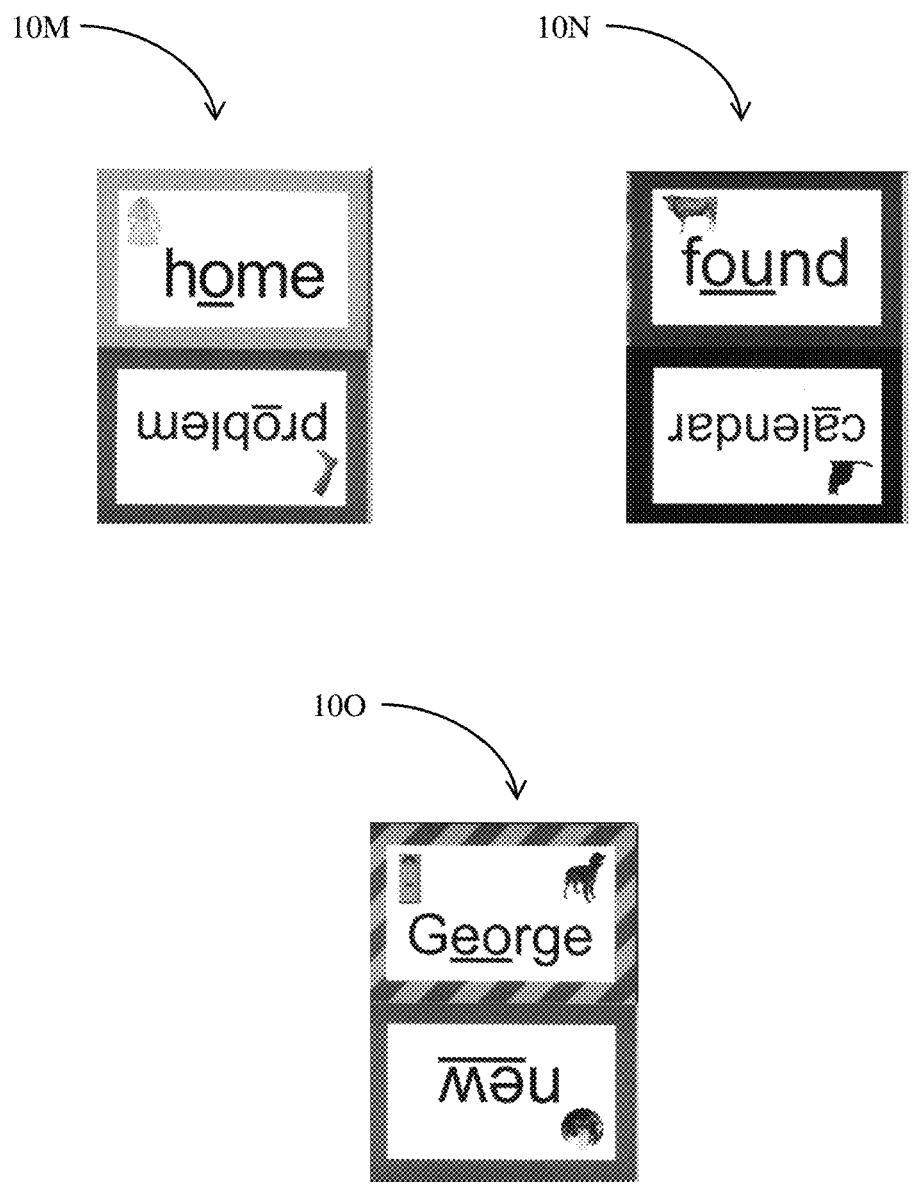
FIG. 4 shows three additional possible exemplary variations among the set of (for example) 104 cards that can be used to play the game, with sections representing: ROSE COAT home, OLIVE SOCK problem 10M; BROWN COW found, BLACK CAT calendar 10N; and AUBURN DOG/ORANGE DOOR George, BLUE MOON new 100.

Each of the 15 key phrases corresponding with the 15 sounds is represented visually by two visual cues, such as a "green" border (a coloration) and a cup of green "tea" (an image of an object) in card 10A shown in FIG. 1. Such a cueing system makes the game engaging and accessible to all players regardless of age (i.e., age six or older), first language background (i.e., English language learners or native speakers), or literacy level (i.e. young readers and emerging-literacy adults), while promoting oral and reading practice. Emerging readers could, for example, successfully decode (read) the words on a set of cards, while English language learners could successfully pronounce the words on the cards. Subtly embedded in what may seem to be a simple legend are the 15 vowel sounds of American English. The use of the key word phrases and accompanying images eliminates the need for the phonetic symbols often seen in dictionaries and glossaries.

A deck of 104 cards can support between two and six players in the word game 200. Multiple decks may be combined for larger groups. As further discussed below, each card features two word boxes. Each word box features: (1) a key word phrase, illustrated by (A) a color border, and (B) a corresponding image; and (2) a featured word, or a "printed word" that includes alphabetic characters (here, letters of the English alphabet). Together, these features guide the player to say (speak or otherwise audibly pronounce or verbalize) three words (e.g., green tea three), all featuring the same vowel sound. These three words comprise one half of a "spoken turn," as further discussed below. The relationship between the two word boxes on a given card is random, but the provision of two options in the game is significant, as this makes it statistically easier to play a turn.

Retuning to FIG. 1, sample exemplary card 10A includes first and second sections 20, 30. Each section 20, 30 includes visual cues corresponding with one of 15 key phrases. In the first card at the top left of FIG. 1, section 20 includes a green border 40 as its coloration, and a cup of green tea 50 as its object shown as an image. This corresponds with the phrase GREEN TEA. This card also includes featured (printed) word 60 represented by alphabetic characters forming the word "believe." The featured word 60 includes a visual emphasis 70—here, in the form of underlining—so as to make the letters involved in stressed syllables stand out. The section 30 includes a white border and an image of a tie corresponding with key phrase WHITE TIE, with featured word "pie." The sound made when pronouncing each word in the keyword phrase and the featured word in each of the sections 20, 30 is substantially the same: the (A) sound in section 20 and the /uʷ/ sound in section 30. All 15 key phrases are represented in the exemplary cards 10A-O shown in FIGS. 1-4.

Unlike other card games that can be played without speaking, this game revolves around each player taking a spoken turn. Each player's spoken turn follows a basic six-word pattern. The six-word pattern is based on the matching color, image, and vowel sound of the two cards in play: the card on top of the discard pile and the card that is being played. Examples of a spoken turn include:
 "PURPLE SHIRT Thursday, PURPLE SHIRT word"
 "SILVER PIN this, SILVER PIN until"
 "GREEN TEA good evening, GREEN TEA nice to meet you."

In each spoken turn, the player preferably produces the same vowel sound six times: three times from the card on top of the pile, and three more times from the card now being played. The vowel sound in GREEN and TEA, for example, prepares the player to use the same sound in the underlined portion of the featured word (such as please). For each card played, the players should notice the same vowel sound six times: three times from the card on top of the pile, and three more times from the card now being played. These six sequential utterances of the featured vowel sound create a psycholinguistic "flooding" effect, resulting in a brief but intense noticing of the featured vowel sound that helps build phonological awareness among all players (even ones not currently engaged in a spoken turn).

As can be seen in the drawings, each featured word (i.e., printed word presented using alphabetic characters) includes a portion thereof visually emphasized (here, by using underlining, although other methods of emphasis could be used to set apart the emphasized portion, such as by having one or more letters highlighted, bolded, circled, shadowed, embossed, capitalized, super/sub scripted, etc.). In this cueing system, the vowel letter(s) in the stressed syllable of the featured word are underlined. For example: the "a" in "make"; the "ou" in "thought"; the "ou" in "around"; the "ee" in "nice to meet you"; and the "o" in "how do you do?" It is noted that the silent "e" is not included in the underlining protocol, as illustrated in the word "make." Also, routinized phrases such as "nice to meet you" and "how do you do?" behave as phonological words in spoken English. This underlining protocol reflects the unique stress-timed nature of English, i.e. the fact that listening comprehension and speech comprehensibility in spoken English depend on the appropriate use and perception of stress at the word level and at the phrase level.

The color border and the corresponding image together communicate a vowel sound of English without having to resort to phonetic symbols. The two words "green" and "tea," for example, both contain and therefore represent the/iʸ/ sound and serve as cues for the vowel sound of the underlined letters in the featured word. The game is interactive, relying on each player taking a spoken turn that follows a six-word pattern based on two cards: the card on top of the pile and the card about to be played.

One major point of variation in spoken English, known as the Back Vowel Merger, revolves around speakers' use of vowel sounds /a/ and /ɔ/. Some speakers of English recognize these two sounds as distinct, while others perceive them as the same. Those who do not perceive a distinction (hearing both /ɔ/ and /a/ as OLIVE SOCK /a/ and therefore unable to make use of AUBURN DOG) are provided an alternative vowel known as ORANGE DOOR (/or/), an r-controlled vowel common in varieties of English across the Western U.S. and elsewhere. AUBURN DOG words in the game are restricted to those with r-control (such as "more" and "before") so that they can appear in combination with the ORANGE DOOR image with an AUBURN/ORANGE striped border. The speaker chooses the phrase that best reflects that speaker's preferred pronunciation of the word.

To set up the game, the deck of cards should first be shuffled. Each player can be dealt three or more cards, but preferably seven cards. The remaining cards are placed face down in a neat pile. Next to the pile, one card is turned up to begin a "discard pile." The first player looks at his or her cards and tries to match one of the two colors (in the two sections) shown on the top card of the discard pile. If the player has a match, he or she takes a spoken turn and plays the matching card. If a player has no matches among his or her cards, the player draws cards until either 1) he or she has drawn a matching card, or 2) he or she has drawn (for example) three cards, whichever comes first. Other game variations are also available: instead of drawing cards until a match is made, the player may draw only one card and then the game moves on to the next player. Cards that have been played are placed in the discard pile, and the first player to run out of cards is the winner of the game or the round.

Figure 5:
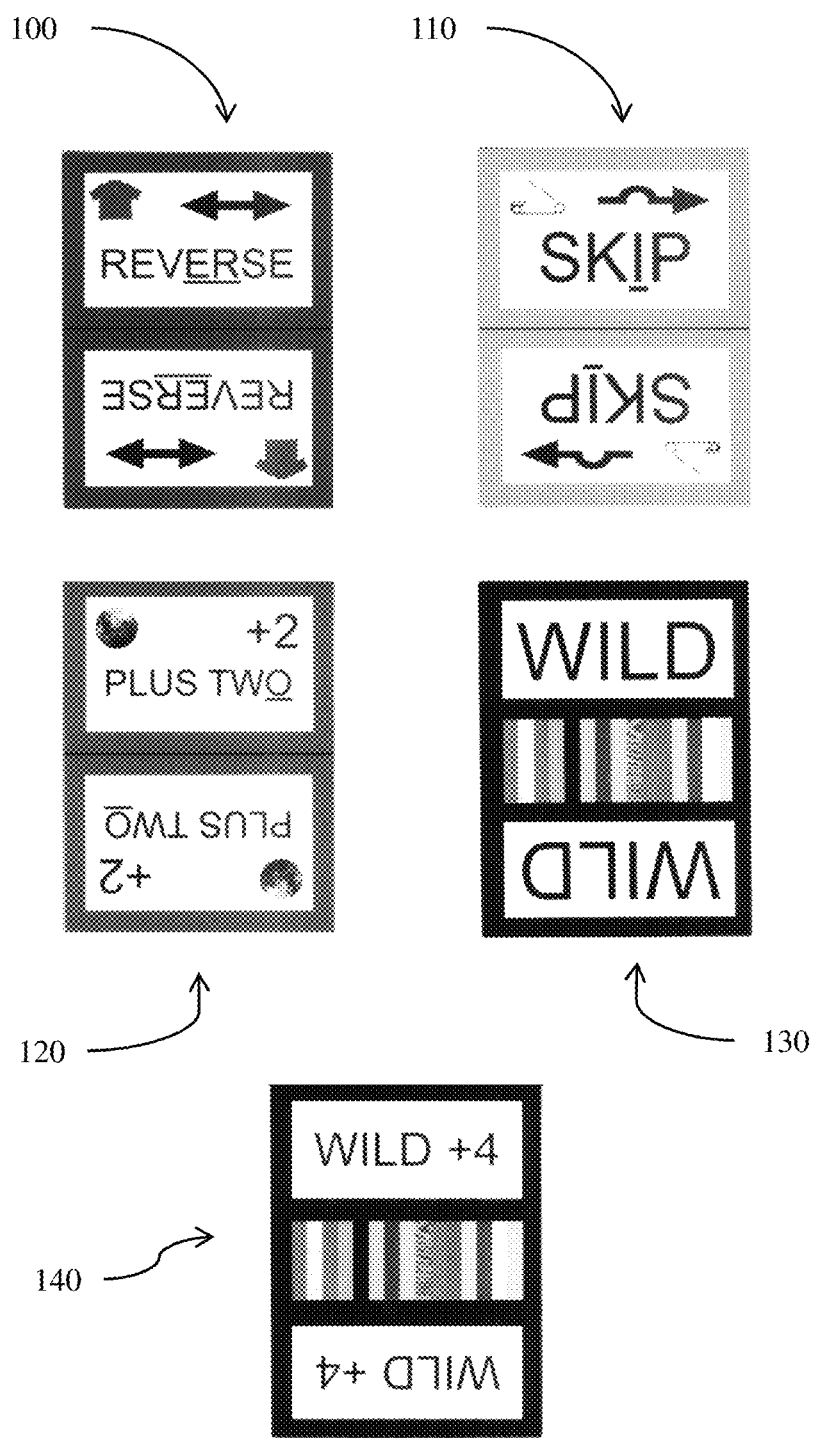
FIG. 5 shows five exemplary bonus cards among the set of (for example) 104 cards that can be used to play the game, with: PURPLE SHIRT reverse 100, SILVER PIN skip 110, BLUE MOON plus two 120, WILD 130, and WILD plus four 140.
Figure 6:
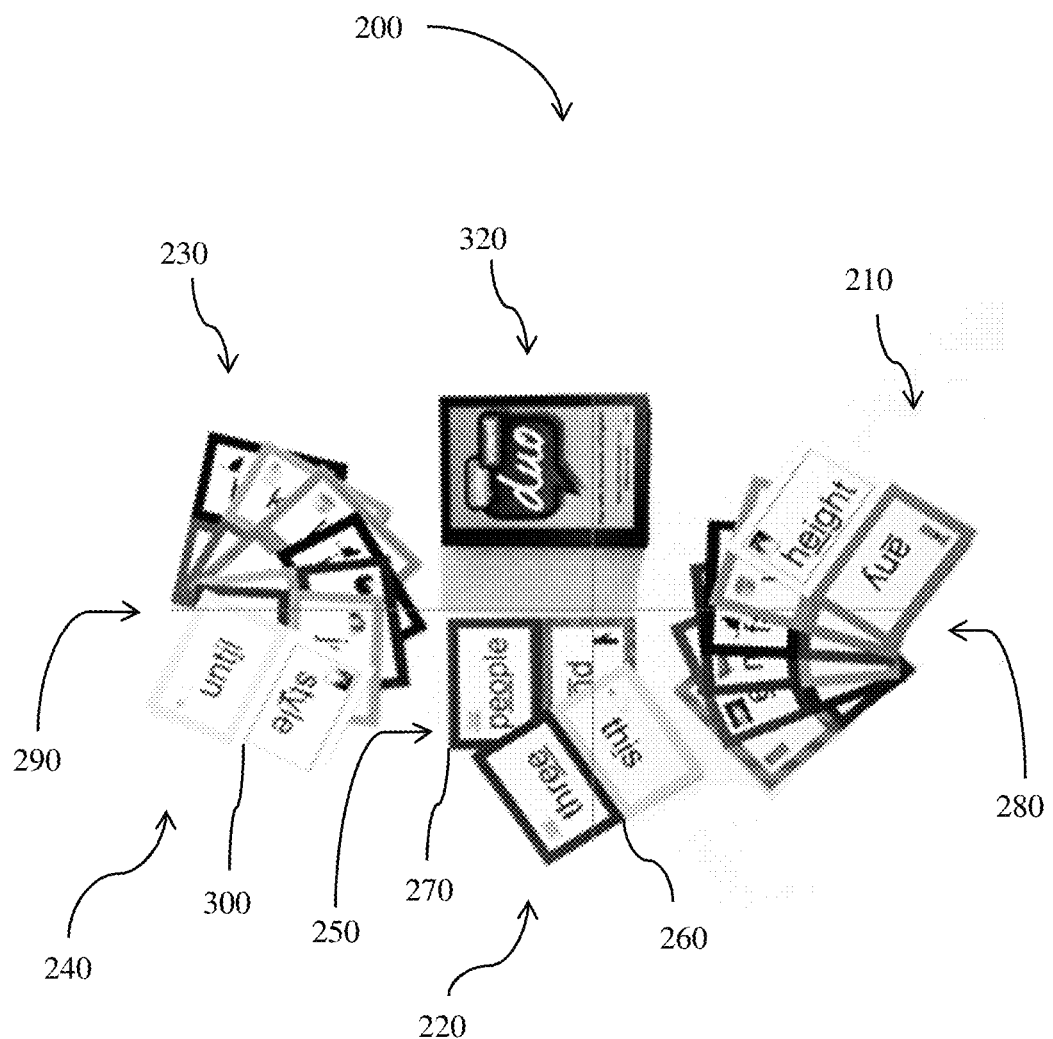
FIG. 6 is an exemplary game 200 using the set of (for example) 104 cards with two players 210, 230, each player having been dealt seven cards to start.

Referring to FIG. 5, as "bonus" or auxiliary gameplay cards, the deck of cards may include, for example: a "reverse" card 100, which changes the direction of the game; "skip" card 110, which requires the player following the player who played the skip card to skip his or her turn; "plus 2" 120, which requires the next player to pick up two cards and lose his or her turn; "WILD" 130, which represents all fifteen color vowels and can be placed on top of any card and allows the player to choose which color the WILD card will represent for the next player, requiring the next player to match that color to play a card from his or her hand; and "WILD+4" 140, which is like the WILD card except that the next player must draw four cards and lose his or her turn. The bonus cards do not replace the spoken turn but are rather alternative instances thereof. That is, "reverse," "skip," and "plus two" serve as featured words when playing those bonus cards as matches to corresponding cards at the top of the discard pile. For example, the "reverse" bonus card may be played as a match to a section of a card 10H (see FIG. 2) corresponding with PURPLE SHIRT heard, and the spoken turn would include an audible verbalization of "PURPLE SHIRT heard, PURPLE SHIRT reverse." Similarly, playing the "skip" bonus card on top of (for example) card 10B (see FIG. 1) at the top of the discard pile would involve speaking of "SILVER PIN women, SILVER PIN skip." And playing the "plus two" bonus card on top of the card with BLUE MOON shoe (see 10K in FIG. 3) would require the player to speak "BLUE MOON shoe, BLUE MOON plus two."

There are at least two exemplary ways to win the game, which can be decided upon before the start of the game. As one option, a "going out first" system could require the game to continue until a player has no more cards in his or her hand, and the player without any cards remaining in hand is declared the winner. Alternatively, a "scoring points" system would grant the first person to get rid of his or her cards in a game to receive points for all of the cards left in opponents' hands, such as: regular cards award ten points each; bonus cards plus two, reverse, and skip award twenty points each; and bonus cards WILD and WILD+4 award fifty points each. In such a point system, the player first to reach a preset number of points (such as 500) is deemed the winner. As another option, the winner of each "round" may be awarded a flat number of points (such as one point) such that the player winning a certain predetermined number of rounds (such as five) wins the game.

Alternative versions of the game include playing the cards "dominoes" style, such that all cards played remain visible as the game proceeds. In this scenario, players engage in the game more cooperatively than competitively, and are motivated to review cards on the table while playing new cards. Player interest in this version of the game is driven by the contrast of vowel sounds versus spelling patterns presented through the cards, a contrast which particularly intrigues adult learners of English.

The words featured in the exemplary version of the game are preferably high frequency words: words that we use in everyday life. High-frequency words are relevant to all audiences, and it is for this reason that the game uses features these words. Alternative versions of the games featuring the spoken turn can target non-native speakers of English and draw on situation- and field-specific vocabularies seen in English for special purposes. For example, an "academic vocabulary" version of the game could incorporate words used in academia; a "medical terminology" version could revolve around medical terms; and a "science terminology" version could focus on words commonly encountered in one or more disciplines of science. Such versions can be based on established word corpora such as the Academic Word List (Coxhead, 2000) or The Corpus of Contemporary American English (2012).

The audiovisual cueing system and games can be used with advanced vocabularies, as even highly-educated and fluent non-native speakers of English might need help with pronunciation. Foreign-born researchers, for example, tend to have an impressive command of written English, but when it comes to speaking, there is little in the orthography of the written word that helps them know how to say that word. The system allows non-native speakers of English to internalize the pronunciation of related words that are similar in print but sound quite different in their pronunciation, such as: "m<u>o</u>lecule" corresponding with OLIVE SOCK; "mol<u>e</u>cular" corresponding with RED DRESS; and "molecul<u>a</u>rity" corresponding with BLACK CAT (or RED DRESS, depending on regional accent).

The audiovisual cueing system also has enormous potential as an educational scaffold in digital/computerized games and apps, including pronunciation dictionaries in which the spoken turn would help the user internalize the sound of spoken English through individual words and phrases. Here, the system serves as an educational scaffold that, as the learner masters word decoding and pronunciation, can be gradually dismantled, resulting in learner mastery. Exemplary versions of the game can be, for example, card-based, board-based, computer-based (executed on computing devices such as personal computers, tablets, and smartphones), or some combination of the three.

The game discussed above, and use of spoken turns, can have significant social implications: they have the potential to bridge social and literacy divides. For example, in a family where the parents are non-native English speakers and their seven year old daughter is an emerging reader, the system provides a game that all can play successfully. The parents are able to support the child in the procedures of the game and the spoken turn, while the child brings to the game her ever-expanding fluency in spoken English. As another example, the game engages native speakers of English while giving them opportunities to notice the slight variations in vowel usage that lie at the heart of accent variation. Such noticing is the first step to accent tolerance. For example, trials of the game prototype have found participants discussing the word "want," realizing that some say this word with an OLIVE vowel /wɑnt/ while others say it with a MUSTARD vowel /wʌnt/. These discussions lead participants to healthy realizations that there are many "right" ways to speak.

The elements of the exemplary spoken turns discussed above have been synthesized into a cohesive cueing system with the potential to revolutionize accessibility to games and learning materials that have previously been inaccessible to the very people they purport to reach.

Various preferred versions of the invention are shown and described above to illustrate different possible features of the invention and the varying ways in which these features may be combined. Apart from combining the different features of the foregoing versions in varying ways, other modifications are also considered to be within the scope of the invention. Following is an exemplary list of such modifications.

First, although the "cards" used in the game may be physical—made of (for example) paper products like cardboard or suitable plastics—the term "card" also encompasses virtual presentations using displays on (for example) mobile devices (including smartphones, tablets, notebooks, laptops, etc.) or any other computing device able to display or project the cues in a visible manner.

Second, although the exemplary cueing system and text markup protocol are discussed in the context of a card game, it should be noted that they are applicable not only to other word-based learning games, including digital games and apps, but also to educational materials and software in general.

Third, although the cards have been shown with two sections each, the cards may alternatively have different numbers of sections, such as three sections for each card. Moreover, although each section is shown with a colored border, the coloration may be presented in any other suitable form, such as one or more of: a shape (geometric or otherwise) having the corresponding color situated adjacent to the featured word; use of the corresponding color as part of a background; use of the corresponding color in the alphabetic characters of the featured word; etc.

Fourth, while the audiovisual cueing system and the spoken turn are demonstrated in the context of the game discussed above, the game is but one example. The system is applicable to other types of card games, including (for example) "Go Fish" and "Concentration."

Fifth, although the above discussion focuses on the English language, in alternative versions the system and method would be applied to other languages, with printed words formed using the appropriate alphabetic characters of the alternative language.

Sixth, the key word phrases provided above can be customized for different audiences and settings. For example, RED THREAD can replace RED DRESS so as to be more gender neutral.

The invention is not intended to be limited to the preferred versions of the invention described above, but rather is intended to be limited only by the claims set out below. Thus, the invention encompasses all different versions that fall literally or equivalently within the scope of these claims.

What is claimed is:

1. A method of guiding pronunciation using a set of virtual or physical cards, the method comprising:
    playing a turn-based word game that includes:
        presenting a first participant with a set of visual cues corresponding to a keyword phrase, a first featured word, and a second featured word,
            the keyword phrase being represented by a coloration and an image of an object, and
            the first and second featured words being represented by alphabetic characters, wherein each word in the keyword phrase includes a stressed syllable with substantially the same vowel sound as the stressed syllables of the first and second featured words;
            the first featured word being presented to the first participant using a first card dealt thereto from the set of virtual or physical cards; and
            the second featured word being presented to the first participant using a second card at the top of a discard pile; and
        advancing the first participant in the game includes discarding the second card into the discard pile.

2. The method of claim 1, wherein each of the first and second featured words includes at least one alphabetic character that is visually emphasized, the emphasized alphabetic characters corresponding with stressed syllables of the featured words.

3. The method of claim 1, further comprising identifying a successful engagement by the first participant based upon the first participant speaking a succession of words that includes:
    the keyword phrase;
    the first featured word;
    the keyword phrase; and
    the second featured word.

4. The method of claim 1, wherein:
    a second participant is presented with a third featured word represented by alphabetic characters, the third featured word having a stressed syllable with substantially the same sound as the words in the keyword phrase, and the third featured word being presented to the second participant using a third card dealt thereto from the set of virtual or physical cards; and
    the second participant is advanced in the game if, after the first participant has discarded the second card in the discard pile, the second participant:
        audibly speaks the keyword phrase, the second featured word, and the third featured word; and
        discards the third card into the discard pile; and
    an initial one of the first participant or the second participant to discard all cards dealt thereto wins the game or is awarded a number of points.

5. The method of claim 1, wherein the set of virtual or physical cards includes keyword phrases corresponding with vowel sounds in the English language.

6. The method of claim 1, wherein,
    each card of the set of virtual or physical cards includes on its face a first section and a second section;
    the first section having:
        a first visual cue corresponding with a first visual word that is pronounced using a first vowel sound, the first visual cue being at least one of: a first coloration, or a first image of an object; and
        a first printed word that is pronounced using the first vowel sound; and
    the second section having:
        a second visual cue corresponding with a second visual word that is pronounced using a second vowel sound that is different from the first vowel sound, the second visual cue being at least one of:
            a second coloration that is different from the first coloration; and
            a second image of an object that is different from the object in the first image; and
        a second printed word that is pronounced using the second vowel sound, the second printed word being different from the first printed word.

7. The method of claim 6 further including the step of having players draw one or more cards from a draw pile if none of the cards in hand includes a section with a visual cue that is the same as one of the visual cues in one of the sections of the card at the top of the discard pile.

8. The method of claim 6, wherein each section of each card includes both a color border and an image of an object, and pronunciation is guided by the first participant audibly speaking words corresponding with:
    the color border;
    the object; and
    the printed words.

9. The method of claim 1, wherein the set of visual cues is one of a plurality of sets of visual cues;
   wherein each of the sets of visual cues corresponds to a unique respective keyword phrase, a unique respective first featured word, and a unique respective second featured word;
   wherein each of the respective keyword phrases is represented by a respective coloration and a respective image of an object;
   wherein each set of the respective first and second featured words is represented by alphabetic characters; and
   wherein each word in each respective keyword phrase includes a respective stressed syllable with substantially the same vowel sound as the stressed syllables of the corresponding respective first and second featured words.

10. A method of guiding pronunciation using a set of virtual or physical cards, the method comprising:
   presenting a first participant with a set of visual cues corresponding to a keyword phrase, a first featured word, and a second featured word,
      the keyword phrase being represented by a coloration and an image of an object, and
      the first and second featured words being represented by alphabetic characters, wherein each word in the keyword phrase includes a stressed syllable with substantially the same vowel sound as the stressed syllables of the first and second featured words; and
   identifying a successful engagement by the first participant based upon the first participant speaking a succession of words that includes:
      the keyword phrase;
      the first featured word;
      the keyword phrase; and
      the second featured word.

11. The method of claim 10, wherein each of the first and second featured words is visually emphasized, corresponding with stressed syllables of the featured words.

12. The method of claim 11, further comprising:
   playing a turn-based word game wherein
      the first featured word is presented to the first participant using a first card dealt thereto from the set of virtual or physical cards;
      the second featured word is presented to the first participant using a second card at the top of a discard pile; and
      advancing the first participant in the game includes discarding the second card into the discard pile.

13. The method of claim 11, wherein the set of virtual or physical cards includes keyword phrases corresponding with vowel sounds in the English language.

14. The method of claim 13, wherein each section of one or more of the cards includes both a color border, a printed word, and an image of an object, and pronunciation is guided by the first participant audibly speaking words corresponding with:
   the color border;
   the object; and
   the printed word.

15. The method of claim 10, wherein the set of visual cues is one of a plurality of sets of visual cues;
   wherein each of the sets of visual cues corresponds to a unique respective keyword phrase, a unique respective first featured word, and a unique respective second featured word;
   wherein each of the respective keyword phrases is represented by a respective coloration and a respective image of an object;
   wherein each set of the respective first and second featured words is represented by alphabetic characters; and
   wherein each word in each respective keyword phrase includes a respective stressed syllable with substantially the same vowel sound as the stressed syllables of the corresponding respective first and second featured words.

16. A method of guiding pronunciation using a set of virtual or physical cards, the method comprising:
   presenting a first participant with a set of visual cues corresponding to a keyword phrase, a first featured word, and a second featured word,
      the keyword phrase being represented by a coloration and an image of an object, and
      the first and second featured words being represented by alphabetic characters, wherein each word in the keyword phrase includes a stressed syllable with substantially the same vowel sound as the stressed syllables of the first and second featured words;
   wherein each card of the set of virtual or physical cards includes on its face a first section and a second section;
      the first section having:
         a first visual cue corresponding with a first visual word that is pronounced using a first vowel sound, the first visual cue being at least one of: a first coloration, or a first image of an object; and
         a first printed word that is pronounced using the first vowel sound; and
      the second section having:
         a second visual cue corresponding with a second visual word that is pronounced using a second vowel sound that is different from the first vowel sound, the second visual cue being at least one of:
         a second coloration that is different from the first coloration; and
         a second image of an object that is different from the object in the first image; and
      a second printed word that is pronounced using the second vowel sound, the second printed word being different from the first printed word; and
   wherein each section of each card includes a color border and an image of an object, and pronunciation is guided by the first participant audibly speaking words corresponding with:
      the color border;
      the object; and
      the printed words.

* * * * *

UNITED STATES PATENT AND TRADEMARK OFFICE
CERTIFICATE OF CORRECTION

PATENT NO. : 10,446,056 B1
APPLICATION NO. : 15/061531
DATED : October 15, 2019
INVENTOR(S) : Karen Ann Taylor et al.

Page 1 of 1

It is certified that error appears in the above-identified patent and that said Letters Patent is hereby corrected as shown below:

In the Specification

Column 1, Line 53, "/w ʊ́ mə n/" should be --wʊ́mən--.

Column 2, Line 13, "kǽn ə l" should be --kǽnəl--.

Column 2, Line 13-14, "k ə nǽl" should be --kənǽl--.

Column 4, Line 46, "100" should be --10O--.

Column 5, Line 1, "100" should be --10O--.

Column 5, Line 53, "(A)" should be --(Λ)--.

Signed and Sealed this
Tenth Day of December, 2019

Andrei Iancu
*Director of the United States Patent and Trademark Office*